No. 754,859. PATENTED MAR. 15, 1904.
T. A. EDISON.
REVERSIBLE GALVANIC BATTERY.
APPLICATION FILED NOV. 28, 1902.
NO MODEL.
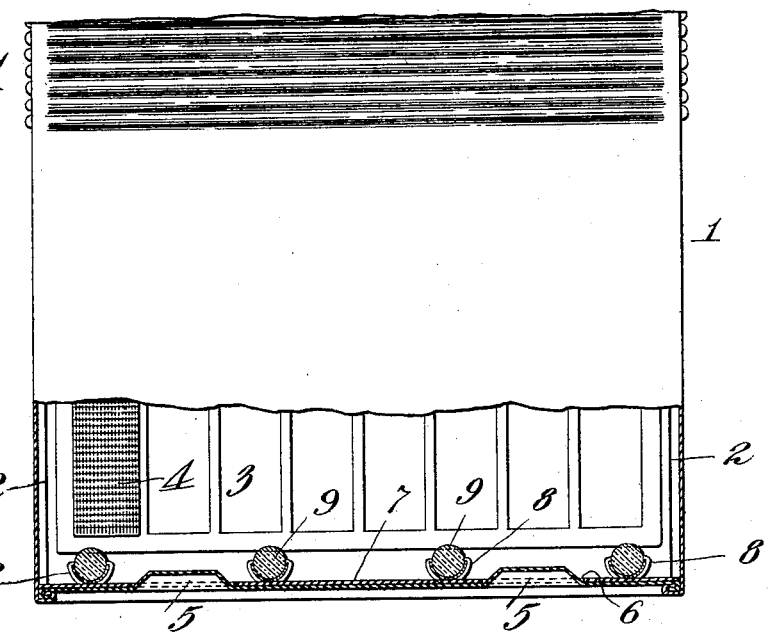
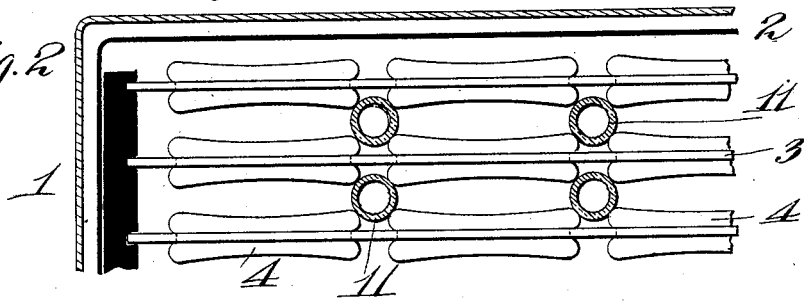
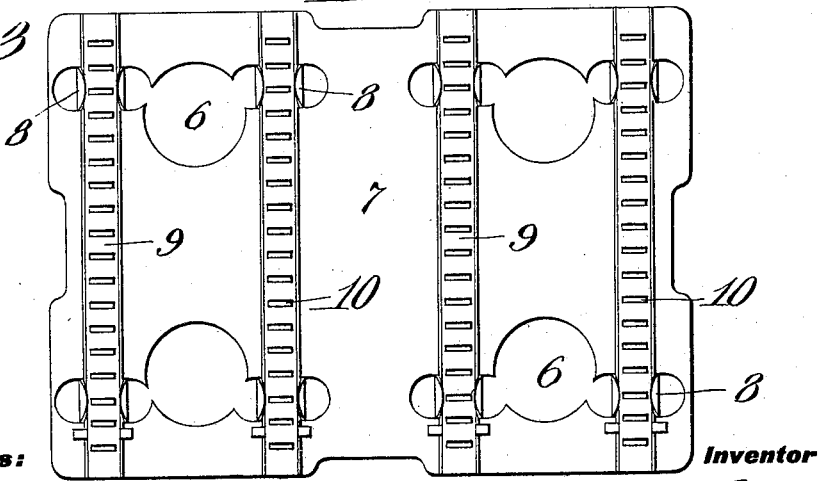
Witnesses:
Jas. F. Coleman
Jno. Robt Taylor
Inventor
Thomas A Edison
by Dyer Edmonds & Dyer
Attorneys No. 754,859. Patented March 15, 1904.

UNITED STATES PATENT OFFICE.

THOMAS A. EDISON, OF LLEWELLYN PARK, NEW JERSEY, ASSIGNOR TO EDISON STORAGE BATTERY COMPANY, OF ORANGE, NEW JERSEY, A CORPORATION OF NEW JERSEY.

REVERSIBLE GALVANIC BATTERY.

SPECIFICATION forming part of Letters Patent No. 754,859, dated March 15, 1904.

Application filed November 28, 1902. Serial No. 133,118. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Reversible Galvanic Batteries, of which the following is a description.

My invention relates to improvements in reversible galvanic or so-called "storage" batteries of the type employing an alkaline electrolyte and insoluble active materials, and the invention has especial reference to the insulators which mechanically support and separate the electrodes and electrically insulate the electrodes from each other, as well as from the bottom and sides of the can or other receptacle.

My object is to provide improved insulators or separators for this purpose which shall be cheap, light, and effective, and at the same time be absolutely unaffected by electrolytic action in an alkaline solution. To this end I make the improved insulators or separators of glass, preferably in the form of rods or tubes, all as I shall more fully hereinafter describe and claim.

In order that the invention may be better understood, attention is directed to the accompanying drawings, forming part of this specification, and in which—

Figure 1 is a side view of a portion of one of my improved storage batteries, showing the bottom part in section to illustrate the insulating-support; Fig. 2, a cross-sectional view, on an enlarged scale, showing a portion of three of the electrodes with the glass insulating-separators in position; and Fig. 3, a plan view of the bottom insulating-support.

In all of the above views corresponding parts are represented by the same numerals of reference.

The can or receptacle 1 is made, preferably, of thin sheet-steel carefully nickel-plated and with corrugated sides, as shown, so as to be very stiff and light, and inside of the can is inserted a lining 2, of hard rubber or other insulating material, in order to insulate the electrodes from the sides. A can of this general construction and form is described and claimed in my application for Letters Patent filed concurrently herewith and is referred to only as an example of the type of battery with which the present improvements may be employed.

The electrodes are formed of plates 3, carrying sectional corrugated perforated nickel-plated spring-steel pockets 4, containing the active material. The bottom of the can is provided with struck-up bosses 5, which engage openings 6 in a metal plate 7, also carefully nickel-plated, so as to be unaffected by electrolytic action. This plate 7 rests on the bottom of the can. The plate 7 is formed with ears 8, which engage the glass rods or tubes 9 9 very slightly above the center, so as to hold the rods or tubes firmly in place without, however, offering any surfaces upon which any active material might lodge. The electrode-plates 3 are supported on the rods or tubes 9, and the latter may be and preferably are formed with slots or grooves 10, into which the bottom edges of said plates are received, so that the plates are properly spaced at their lower ends and transverse movement thereof is consequently prevented. In order to separate the plates mechanically and to insulate them electrically, I employ a series of glass tubes 11, as shown in Fig. 2, and which extend longitudinally of the plates within the spaces formed between adjacent pockets. The separating-rods 11 preferably extend the entire length of the plates and rest at their lower ends on the bottom plate 7. I find in practice that the use of glass insulators makes a very light and cheap construction, while at the same time the insulators are absolutely unaffected by electrolytic action in the alkaline solution.

While I have described my present improvements in connection with storage batteries, it will be, of course, obvious that the separators may be used for supporting or insulating the electrodes or electrode-plates of storage batteries or analogous devices of any other form.

Having now described my invention, what I claim is—

1. In a reversible galvanic battery, the combination with the electrode-plates carrying perforated pockets containing the active material, said pockets projecting beyond the face of the corresponding electrode-plate, of insulating separating-tubes arranged longitudinally between the plates and guided by said pockets and made of material which is unaffected by electrolytic action in the electrolyte, substantially as and for the purposes set forth.

2. In a reversible galvanic battery, the combination with the electrode-plates carrying perforated pockets containing the active material, said pockets projecting beyond the face of the corresponding electrode-plate, of glass separating-tubes arranged longitudinally between the plates and guided by said pockets, substantially as and for the purposes set forth.

3. An insulating-support for the electrode-plates of reversible galvanic batteries, comprising a metal plate unaffected by electrolytic action, and glass rods or tubes carried by said plate, substantially as and for the purposes set forth.

4. An insulating-support for the electrode-plates of reversible galvanic batteries, comprising a metal plate unaffected by electrolytic action, and slotted glass rods or tubes carried by said plate, substantially as and for the purposes set forth.

5. An insulating-support for the electrode-plates of reversible galvanic batteries, comprising a plate, integral lugs formed on said plate, and glass rods or tubes carried by said lugs, substantially as and for the purposes set forth.

6. An insulating-support for the electrode-plates of reversible galvanic batteries, comprising a plate, integral lugs formed on said plate, and slotted glass rods or tubes carried by said lugs, substantially as and for the purposes set forth.

This specification signed and witnessed this 13th day of November, 1902.

THOS. A. EDISON.

Witnesses:
FRANK L. DYER,
J. F. RANDOLPH.